United States Patent
Wakuda et al.

(10) Patent No.: US 8,614,962 B2
(45) Date of Patent: Dec. 24, 2013

(54) COMMUNICATION DEVICE, COMMUNICATION METHOD, AND PROGRAM

(75) Inventors: Kensaku Wakuda, Kanagawa (JP); Shinji Kobayashi, Kanagawa (JP); Akio Tanaka, Tokyo (JP); Shunsuke Miura, Tokyo (JP); Yoshinobu Kure, Kanagawa (JP)

(73) Assignee: Sony Corporation, Tokyo (JP)

( * ) Notice: Subject to any disclaimer, the term of this patent is extended or adjusted under 35 U.S.C. 154(b) by 381 days.

(21) Appl. No.: 13/065,426

(22) Filed: Mar. 22, 2011

(65) Prior Publication Data

US 2011/0255430 A1     Oct. 20, 2011

(30) Foreign Application Priority Data

Mar. 31, 2010   (JP) ................. P2010-082339

(51) Int. Cl.
*H04L 12/26*     (2006.01)

(52) U.S. Cl.
USPC ............ 370/252; 370/230; 370/235; 370/250

(58) Field of Classification Search
USPC .............. 370/229, 230, 242, 252; 703/13; 709/224
See application file for complete search history.

(56) References Cited

U.S. PATENT DOCUMENTS

| | | | |
|---|---|---|---|
| 7,239,611 B2 * | 7/2007 | Khisti et al. | 370/230 |
| 2002/0136162 A1 * | 9/2002 | Yoshimura et al. | 370/229 |
| 2004/0117474 A1 * | 6/2004 | Ginkel et al. | 709/224 |
| 2008/0120081 A1 * | 5/2008 | Chandrashekar et al. | 703/13 |
| 2009/0052333 A1 * | 2/2009 | Vankov et al. | 370/242 |

FOREIGN PATENT DOCUMENTS

| | | |
|---|---|---|
| JP | 2004-180185 A | 6/2004 |
| JP | 2006-013969 A | 1/2006 |
| JP | 2009-290891 A | 12/2009 |

* cited by examiner

*Primary Examiner* — Brian D Nguyen
*Assistant Examiner* — Toan Nguyen
(74) *Attorney, Agent, or Firm* — Sony Corporation

(57) ABSTRACT

There is provided a communication device including a communication state determination section which determines a communication state corresponding to a transmission rate demanded from a simulation engine based on a transmission rate and a state of communication at the transmission rate between a first communication state measurement device and a second communication state measurement device via a real network, a traffic generation section which generates traffic by creating data based on the communication state determined by the communication state determination section, a protocol processing section which creates a packet including the data created by the traffic generation section, and a communication section which transmits the packet created by the protocol processing section to another communication device.

6 Claims, 5 Drawing Sheets

COMMUNICATION DEVICE, COMMUNICATION METHOD, AND PROGRAM

CROSS-REFERENCE TO RELATED APPLICATION

The present application claims priority from Japanese Patent Application No. JP 2010-082339 filed in the Japanese Patent Office on Mar. 31, 2010, the entire content of which is incorporated herein by reference.

BACKGROUND OF THE INVENTION

1. Field of the Invention

The present invention relates to a communication device, a communication method, and a program.

2. Description of the Related Art

In recent years, there has been developed a network simulator as a computer for calculating a network state. In a network simulator of the past, for example, there is technology for exactly reproducing environment which the network is actually in (hereinafter, also referred to as "real environment").

However, in the technology for exactly reproducing the real environment, it is necessary to reproduce the same network topology as the real environment and communication processing in a communication protocol at the same link-level as the real environment. Accordingly, in the technology for exactly reproducing the real environment, for example, it is difficult to exactly reproduce the following processing by only using a computer simulation: processing that is performed in the Internet as an example of the network, which is rendered complex and black box-like; processing that is performed by a wireless section which largely depends on external factors; and the like.

Further, there is developed technology (for example, see JP 2006-13969A) that measures a network state in advance by allowing a test packet for measuring the network state to flow through an actual network (hereinafter, also referred to as "real network") which is to be a subject to be calculated by a network simulator, and reproduces in simulation the network state obtained by the measurement. According to such technology, the issue of the above-mentioned technology for exactly reproducing the real environment can be solved.

SUMMARY OF THE INVENTION

However, in the technology for measuring a network state in advance by allowing the test packet for measuring the network state to flow through the real network, new traffic is generated by allowing the test packet to flow. Therefore, there was an issue that it was difficult to accurately measure the real network state.

In light of the foregoing, it is desirable to provide a novel and improved technology which is capable of calculating the network state without the necessity to exactly reproduce the real environment and without any influence of the traffic generated by allowing the test packet to flow.

According to an embodiment of the present invention, there is provided a communication device which includes a communication state determination section which determines a communication state corresponding to a transmission rate demanded from a simulation engine based on a transmission rate and a state of communication at the transmission rate between a first communication state measurement device and a second communication state measurement device via a real network, a traffic generation section which generates traffic by creating data based on the communication state determined by the communication state determination section, a protocol processing section which creates a packet including the data created by the traffic generation section, and a communication section which transmits the packet created by the protocol processing section to another communication device.

The communication state determination section may determine, as the communication state, a state of communication between the first communication state measurement device and the second communication state measurement device via the real network at a transmission rate close to the transmission rate demanded from the simulation engine.

When the transmission rate of the communication between the first communication state measurement device and the second communication state measurement device via the real network increases in stages, and where the transmission rate which increases in stages is represented by $S''k$ ($0 \le k \le n-1$) and the transmission rate demanded from the simulation engine is represented by $S'$, the communication state determination section may calculate $k$ which satisfies $S' > S''k$ for the first time when $k$, starting with $n-1$, is decreased by 1 at a time, may update $k$ with a value obtained by adding 1 to the calculated $k$, and may determine $S''k$ expressed by the updated $k$ as the communication state.

Where the transmission rate which increases in stages is represented by $S''k$ ($0 \le k \le n-1$), the transmission rate demanded from the simulation engine is represented by $S'$, and a predetermined coefficient is represented by $\alpha$, the communication state determination section may determine, as the communication state, $k$ which satisfies $S' < S''k - \alpha (S''k - S''k-1)$ for the first time when $k$, starting with 1, is increased by 1 at a time.

The communication state determination section may determine the communication state based on statistical data obtained by performing statistical processing on the transmission rate and the state of the communication at the transmission rate between the first communication state measurement device and the second communication state measurement device via the real network.

When the transmission rate of the communication between the first communication state measurement device and the second communication state measurement device via the real network increases in stages, and where the transmission rate which increases in stages is represented by $S''k$ ($0 \le k \le n-1$), the transmission rate demanded from the simulation engine is represented by $S'$, and an average value of reception rates corresponding to transmission rates $S''0, 1, \ldots, n-1$ is represented by $R''0, 1, \ldots, n-1$, the communication state determination section may find $k$ which satisfies $S''k \le S' < S''k+1$, may calculate the coefficient $\alpha$ by using Equation (1) $\alpha = 1 - (S' - S''k)/(S''k+1 - S''k)$, may calculate the average value $R'$ of reception rates with respect to $S'$ by using Equation (2) $R' = \alpha \cdot R''k + (1-\alpha) \cdot R''k+1$, may calculate a dispersion value $\sigma'$ with respect to $S'$, may generate normal distribution random numbers based on $R'$ and $\sigma'$, may calculate a transmission rate based on the generated normal distribution random numbers, and may determine a state of communication corresponding to the calculated transmission rate as the communication state.

Further, according to another embodiment of the present invention, there is provided a communication method which includes the steps of determining a communication state corresponding to a transmission rate demanded from a simulation engine based on a transmission rate and a state of communication at the transmission rate between a first communication state measurement device and a second communication state measurement device via a real network, generating traffic by creating data based on the communication state, creating a packet including the data, and transmitting the packet to another communication device.

Further, according to another embodiment of the present invention, there is provided a program for causing a computer to function as a communication device which includes a communication state determination section which determines a communication state corresponding to a transmission rate demanded from a simulation engine based on a transmission rate and a state of communication at the transmission rate between a first communication state measurement device and a second communication state measurement device via a real network, a traffic generation section which generates traffic by creating data based on the communication state determined by the communication state determination section, a protocol processing section which creates a packet including the data created by the traffic generation section, and a communication section which transmits the packet created by the protocol processing section to another communication device.

According to the embodiments of the present invention described above, it is possible to calculate the network state without the necessity to exactly reproduce the real environment and without any influence of the traffic generated by allowing the test packet to flow.

DETAILED DESCRIPTION OF THE EMBODIMENTS

Figure 1:
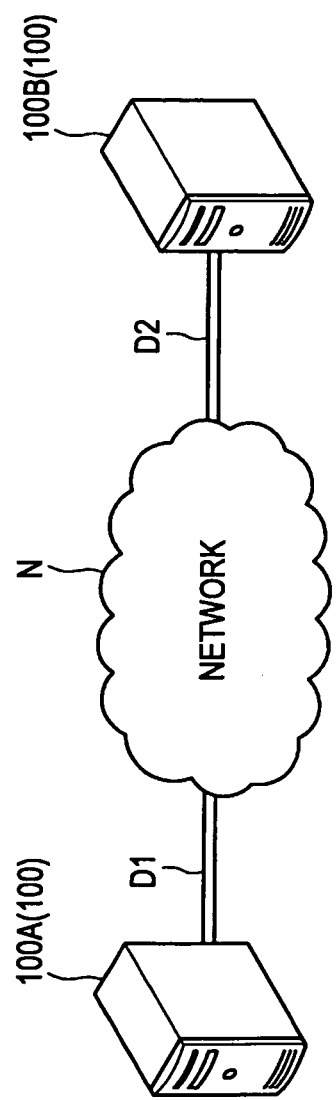
FIG. 1 is a diagram showing a usage example of a communication state measurement device according to an embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Further, the "detailed description of the embodiments" will be described in the following order.

1. Embodiment
1-1. Usage example of device which measures communication state
1-2. Configuration example of network simulator
1-2-1. First communication state determination technique
1-2-2. Second communication state determination technique
1-2-3. Details of first communication state determination technique
1-2-3-1. Method of selecting data
1-2-3-2. Technique of applying data
1-2-3-3. Preferable measurement data to be acquired
1-2-4. Details of second communication state determination technique
1-2-4-1. Method of selecting and applying data
1-3. Details of function of communication state setting section
2. Modified example
3. Summary <1. Embodiment>

[1-1]. Usage Example of Device which Measures Communication State

The present embodiment relates to a network simulation system, and more particularly, to a network simulation system which controls traffic at a packet level and controls a communication state. More specifically, in simulation software which reproduces a virtual network on a computer, a network simulation close to an actual network can be easily realized by changing a network state based on a measurement result in a real network environment.

FIG. 1 is a diagram showing a usage example of a device which measures a communication state. As shown in FIG. 1, before the network simulation, two communication state measurement devices 100, which are a communication state measurement device 100A and a communication state measurement device 100B, are each connected to a network N which is an actual network to be a subject to be calculated, and are operated. The communication state measurement device 100A and the network N are connected to each other by a full-duplex link D1, and the communication state measurement device 100B and the network N are connected to each other by a full-duplex link D2. Hereinafter, in the case where the communication state measurement device 100A and the communication state measurement device 100B are not particularly distinguished from each other, they are each referred to as communication state measurement device 100.

The communication state measurement device 100A and the communication state measurement device 100B perform end-to-end communication with each other via the full-duplex link D1, the full-duplex link D2, and the network N, and the communication state measurement device 100A or the communication state measurement device 100B measures the communication state in the case of performing the communication. As the communication state which is to be a subject to be measured, there are given a packet reception rate, a packet latency, a packet loss rate, a burst packet loss rate, a packet sequence error rate, a duplicate packet rate, and the like, and at least the packet reception rate is included in the communication state. Those communication states are acquired by the communication state measurement device 100A or the communication state measurement device 100B, along with time at which the communication states are measured.

The communication state measurement device 100A transmits a test packet configured from a UDP (User Datagram Protocol) packet and the like to the communication state measurement device 100B. At that time, the transmission rate of the test packet transmitted by the communication state measurement device 100A is gradually increased, and the reception rate of the test packet at the communication state measurement device 100B is measured. The test packet may be of any type. In order to grasp to which extent the test packet transmitted from the communication state measurement device 100A can be received at the communication state measurement device 100B, the communication state measurement device 100 measures a maximum reception rate which represents the largest reception rate that can be received by the communication state measurement device 100B. For example, in the case where the reception rate of the test packet at the communication state measurement device 100B decreases even though the transmission rate of the test packet from the communication state measurement device 100A increases, the reception rate immediately before the reception rate decreases is measured as the maximum reception rate.

Next, the communication state measurement device 100A discretely varies the transmission rate from zero (non-communication state) to the maximum reception rate and transmits the test packet to the communication state measurement device 100B, and the communication state measurement device 100 measures a communication state for each transmission rate for a predetermined time period (for example, 180 seconds per transmission rate in 1 Mbps unit). By the measurement, the communication state measurement device 100 can acquire measurement data in which the transmission rate and the communication state are associated with each other.

Next, the communication state measurement device 100 classifies the measurement data by performing statistical processing of the measurement data. For example, the communication state measurement device 100 performs the classification by determining, on the basis of the packet loss rate and the packet latency, whether the measurement data is acquired when the network N is in a congestion state or is acquired when the network N is not in the congestion state. More specifically, for example, the communication state measurement device 100 can determine that the network N is in the congestion state in the case where the packet loss rate exceeds a predetermined value. Further, for example, the communication state measurement device 100 can determine that the network N is in the congestion state in the case where the packet latency exceeds a predetermined value.

[1-2. Configuration Example of Network Simulator]

Figure 2:
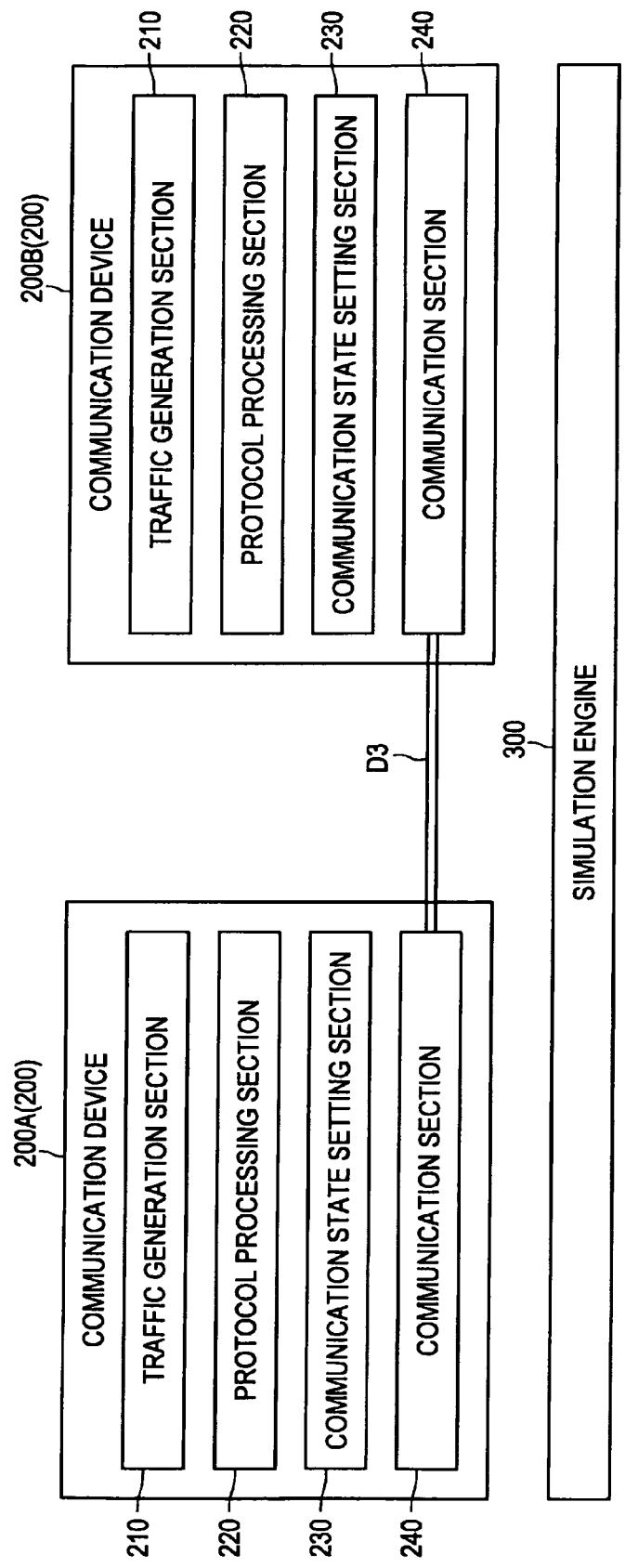
FIG. 2 is a diagram showing a configuration example of a network simulator according to the embodiment.

FIG. 2 is a diagram showing a configuration example of a network simulator according to the embodiment. As shown in FIG. 2, the network simulator includes two communication devices 200, which are a communication device 200A and a communication device 200B, a full-duplex link D3 which links the communication device 200A and the communication device 200B, and a simulation engine 300. Hereinafter, in the case where the communication device 200A and the communication device 200B are not particularly distinguished from each other, they are each referred to as communication device 200. The communication device 200 includes a traffic generation section 210, a protocol processing section 220, a communication state setting section 230, and a communication section 240. The communication state setting section 230 functions as an example of a communication state determination section.

The traffic generation section 210 has a function of generating traffic by creating data that is communicated between the communication device 200A and the communication device 200B based on the communication state determined by the communication state setting section 230. The protocol processing section 220 has a function of performing processing in accordance with a communication protocol between the communication device 200A and the communication device 200B. Specifically, there is assumed processing of creating a packet including the data created by the traffic generation section 210. The traffic generation section 210, the protocol processing section 220, and the communication state setting section 230 are each configured from, for example, a CPU (Central Processing Unit) and a RAM (Random Access Memory), and are each realized by developing a program stored in a storage section (not shown) included in the communication device 200 in the RAM by the CPU and executing the program developed in the RAM by the CPU. The communication section 240 is, for example, configured from a communication device.

The input of the measurement data acquired by the communication state measurement device 100 from an operator is accepted by an input section (not shown) included in the communication device 200, and the measurement data is stored in a storage section (not shown) included in the communication device 200. Further, the measurement data acquired by the communication state measurement device 100 may be transmitted from the communication state measurement device 100 to the communication device 200 via a communication line, and may be stored in the storage section (not shown) included in the communication device 200. The measurement data stored in the storage section (not shown) included in the communication device 200 is used by the communication state setting section 230.

When a simulation by the simulation engine 300 is started by an instruction or the like from the operator, the communication device 200A or the communication device 200B is notified of a transmission rate demanded by the simulation engine 300. The transmission rate demanded by the simulation engine 300 may be input to the simulation engine 300 in real time by the instruction from the operator, or how to vary the transmission rate with the elapse of time may be registered in the simulation engine 300 in advance.

When the transmission rate is demanded from the simulation engine 300, a communication state is determined in the communication device 200A or the communication device 200B depending on the transmission rate demanded from the simulation engine 300, and communication between the communication device 200A and the communication device 200B via the full-duplex link D3 is performed in accordance with the determined communication state. The transmission rate demanded from the simulation engine 300 is directly output to the communication state setting section 230 of the communication device 200A or the communication device 200B via a leased line, thereby notifying the communication device 200A or the communication device 200B of the transmission rate demanded from the simulation engine 300, for example. The communication state setting section 230 determines the communication state depending on the transmission rate demanded from the simulation engine 300 and based on the measurement data acquired by the communication state measurement device 100, and as the communication state determination technique, the following two techniques can be suggested.

[1-2-1. First Communication State Determination Technique]

A first communication state determination technique is a technique for determining a communication state of measurement data measured at a transmission rate close to the transmission rate demanded from the simulation engine 300 as a communication state between the communication device 200A and the communication device 200B. In this technique, although it is necessary that the measurement data be acquired at small transmission rate-intervals in advance, there is an advantage that there is a temporal correlation between determined communication states.

[1-2-2. Second Communication State Determination Technique]

A second communication state determination technique is a technique for collecting statistics from measurement data, and applying the statistical data in accordance with the transmission rate demanded from the simulation engine 300. In this technique, although it is not guaranteed that there is a temporal correlation between communication states, there is an advantage that it is easy to calculate a communication state between discretely-acquired measurement data and the measurement data.

[1-2-3. Details of First Communication State Determination Technique]

[1-2-3-1. Method of Selecting Data]

Figure 3:
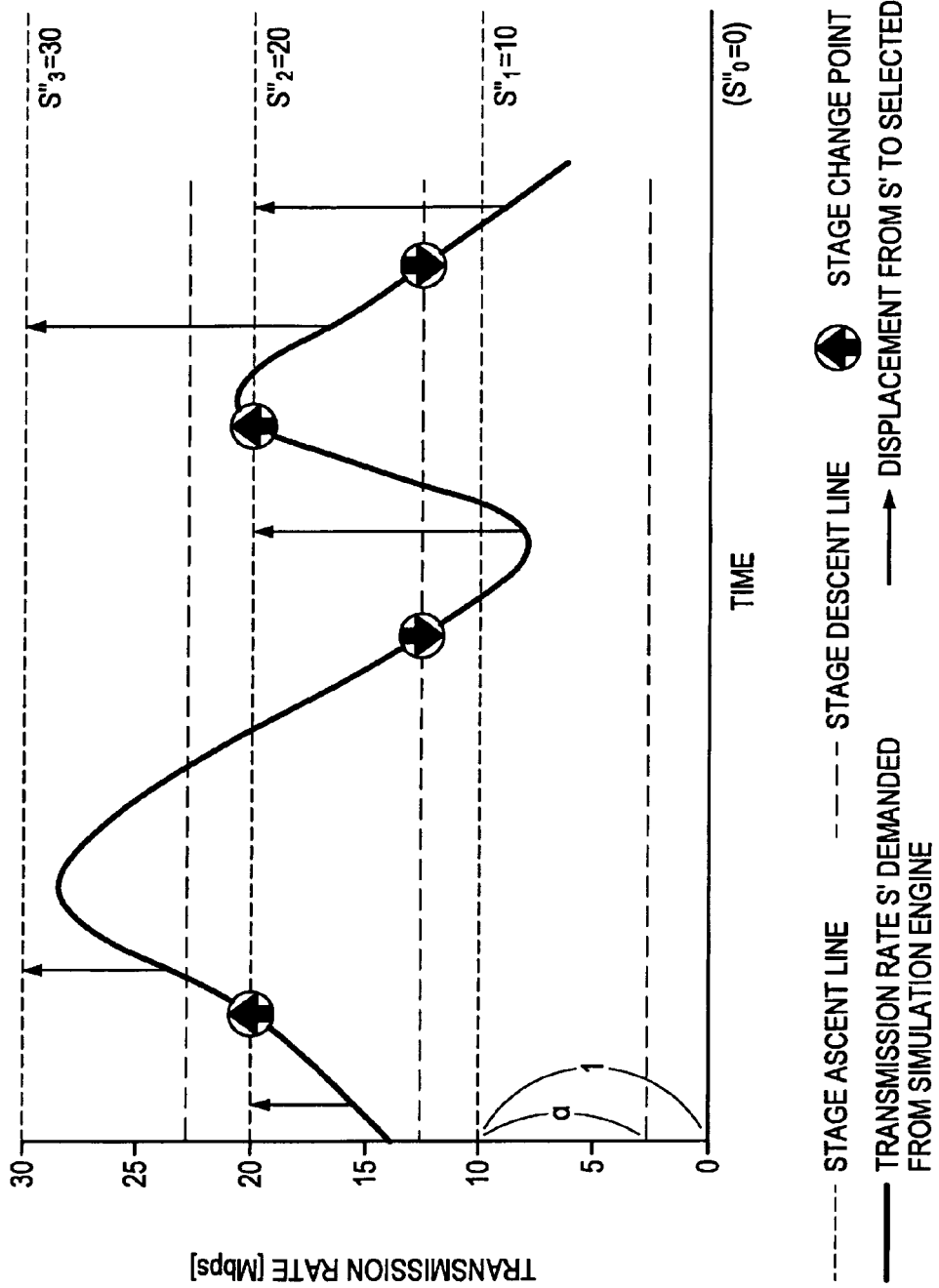
FIG. 3 is a sample graph for illustrating a first communication state determination technique.
Figure 4:
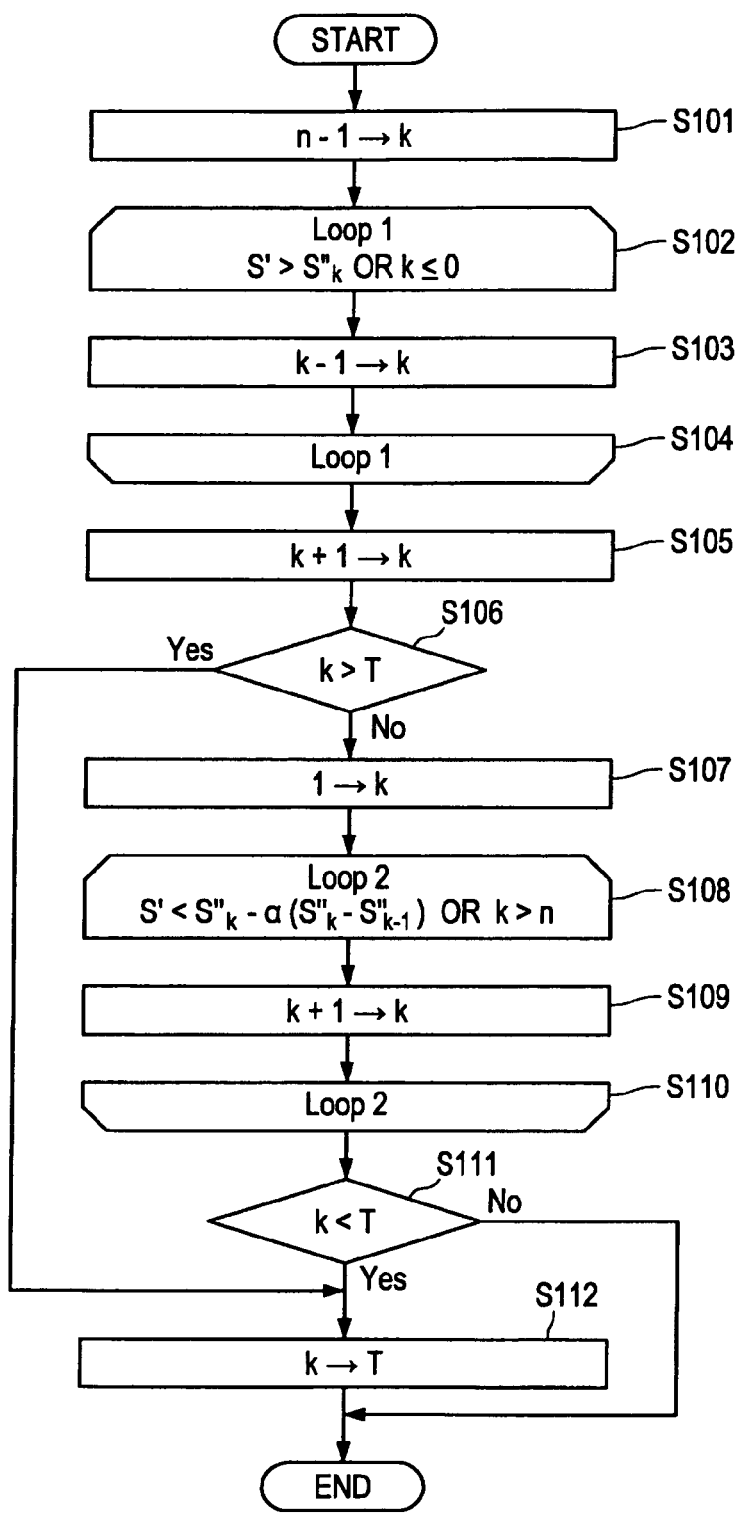
FIG. 4 is a flowchart showing a flow of the first communication state determination technique.

The communication state setting section 230 selects appropriate measurement data from the measurement data acquired by the communication state measurement device 100 based on the transmission rate demanded from the simulation engine 300. Measurement data measured at a transmission rate higher than the transmission rate demanded from the simulation engine 300 is basically selected. Here, the selected measurement data is referred to as "stage", and the selection technique thereof will be described by using figures. FIG. 3 shows a sample graph for illustrating the first communication state determination technique, and FIG. 4 shows a flowchart showing a flow of the first communication state determination technique. Note that the meanings of the symbols shown in the figures are as follows.

S': Transmission rate demanded from simulation engine 300

S"0, 1, 2, ..., n: Transmission rate at the time of acquiring measurement data at communication state measurement device 100 (S"0=0, S"k<S"k+1)

α: Coefficient of variation (0≤α≤1.0)

T: Current stage number

Before the processing (Step S101 to Step S112) shown in FIG. 4 is started, T is initialized by the communication state setting section 230. The communication state setting section 230 executes the processing (Step S101 to Step S112) shown in FIG. 4 every time a transmission rate S' is demanded from the simulation engine 300. The communication state setting section 230 uses T, which the communication state setting section 230 holds at the time point when the execution of the processing (Step S101 to Step S112) shown in FIG. 4 is completed, when executing the processing (Step S101 to Step S112) shown in FIG. 4 next.

When the transmission rate S' is demanded from the simulation engine 300, the communication state setting section 230 substitutes n−1 for k (Step S101), and performs the processing shown in Loop 1 (Step S102 to Step S104). In the processing shown in Loop 1, the communication state setting section 230 performs the processing shown in Step S103 until S'>S"k or k≤0 is satisfied. In Step S103, the communication state setting section 230 substitutes k−1 for k (Step S103). When the communication state setting section 230 exits from the processing shown in Loop 1, the communication state setting section 230 substitutes k+1 for k (Step S105).

The communication state setting section 230 determines whether or not k is larger than T (Step S106). In the case where it is determined that k is larger than T ("Yes" in Step S106), the communication state setting section 230 proceeds to Step S112. In the case where it is determined that k is equal to or smaller than T ("No" in Step S106), the communication state setting section 230 substitutes 1 for k (Step S107), and performs the processing shown in Loop 2 (Step S108 to Step S110). In the processing shown in Loop 2, the communication state setting section 230 performs the processing shown in Step S109 until S'<S"k−α(S"k−S"k−1) or k≥n is satisfied. In Step S109, the communication state setting section 230 substitutes k+1 for k (Step S109).

When the communication state setting section 230 exits from the processing shown in Loop 2, the communication state setting section 230 determines whether or not k is smaller than T (Step S111). In the case where it is determined that k is smaller than T ("Yes" in Step S111), the communication state setting section 230 proceeds to Step S112. In the case where it is determined that k is equal to or larger than T ("No" in Step S111), the communication state setting section 230 terminates the processing. In the case of proceeding to Step S112, the communication state setting section 230 substitutes k for T, and terminates the processing.

[1-2-3-2. Technique of Applying Data]

The communication state setting section 230 does not apply the transmission rate of the selected measurement data as it is as a transmission rate, and sets the transmission rate as a maximum transmission rate.

[1-2-3-3. Preferable Measurement Data to be Acquired]

Since the measurement data acquired by the communication state measurement device 100 is used almost as it is for the simulation, it is preferred that the communication state measurement device 100 perform the measurement under various conditions. For example, the communication state measurement device 100 not only performs the measurement at small transmission rate-intervals, but also creates data in which variation in a network state with day of the week or time is taken into account. However, it should be noted that temporal continuity becomes absent when switching data.

[1-2-4. Details of Second Communication State Determination Technique]

[1-2-4-1. Method of Selecting and Applying Data]

The communication state measurement device 100 performs statistical processing on measurement results of communication states with respect to respective transmission rates, and calculates the average value and the dispersion value of the communication states as statistics. At the time of the simulation, the communication state setting section 230 uses a value obtained by performing linear interpolation to the statistics of the measurement results based on the transmission rate demanded from the simulation engine 300. Here, there will be shown an example of performing, by the communication state measurement device 100, statistical processing of reception rates.

In the example, a transmission rate demanded from the simulation engine 300 is represented by S', and an average value of reception rates corresponding to transmission rates S"0, 1, ..., n−1 is represented by R"0, 1, ..., n−1.

The communication state setting section 230 finds k which satisfies S"k≤S'<S"k+1, and calculate a coefficient α by using Equation (1).

$$\alpha = 1 - (S' - S''k)/(S''k+1 - S''k) \quad (1)$$

Next, the communication state setting section 230 calculates an average value R' of reception rates with respect to S' by using Equation (2).

$$R' = \alpha \cdot R''k + (1-\alpha) \cdot R''k+1 \quad (2)$$

In the same manner, the communication state setting section 230 calculates a dispersion value σ' with respect to S', generates normal distribution random numbers based on R' and σ', and calculates a transmission rate S based on the generated normal distribution random numbers. The communication state setting section 230 calculates the transmission rate S by such a technique at every predetermined time period, and updates the transmission rate used by the traffic generation section 210 with the transmission rate S calculated at every predetermined time period.

[1-3. Details of Function of Communication State Setting Section]

Basic policies are: to set an upper limit of the transmission rate by using the leaky bucket algorithm; and to discard a packet which is in the bucket, to switch an order of packets, and to create a duplicate packet.

Figure 5:
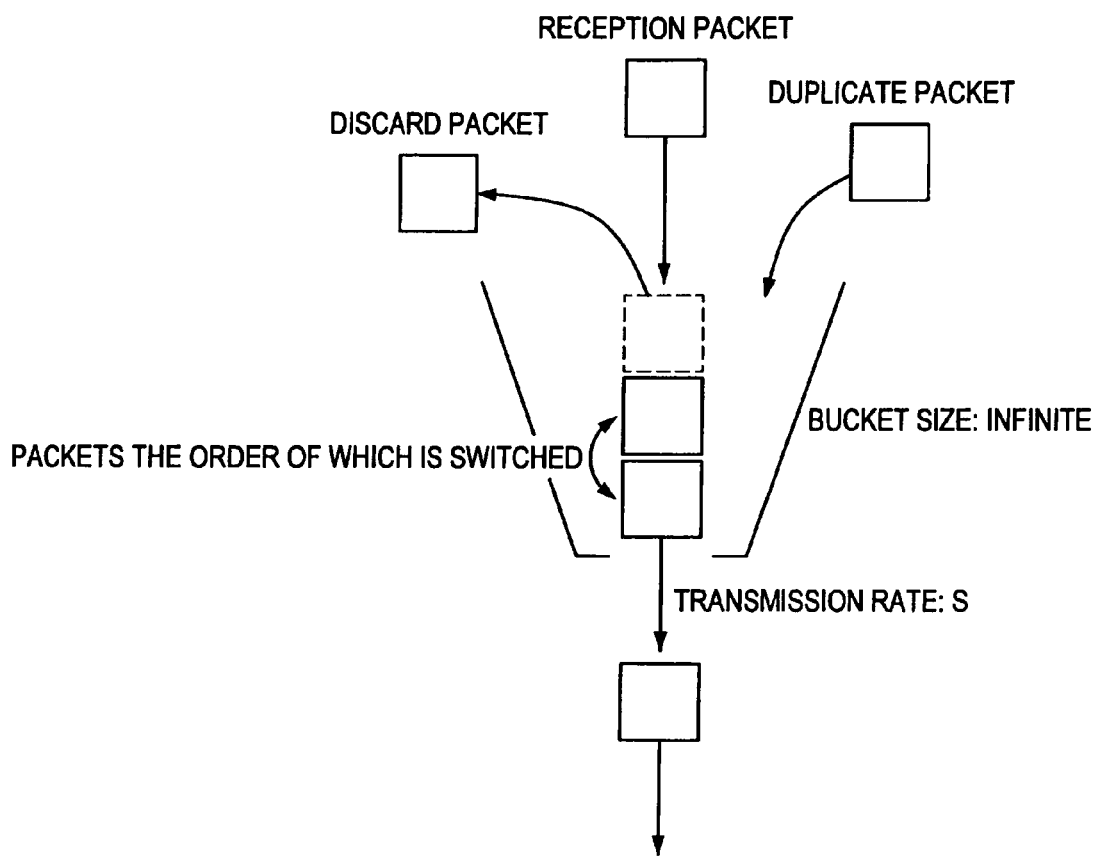
FIG. 5 is a diagram for illustrating the details of a function of a communication state setting section.

What is important here is to prevent the packet loss from occurring independently of the measurement result, which is caused by the packets collected in the bucket. Accordingly, FIG. 5 is a diagram for illustrating the details of a function of a communication state setting section. As shown in FIG. 5, there is assumed a leaky bucket, the bucket size of which is infinite (practically limited dependent on a device for operating the simulator), and there are only performed the setting of the rate (outflow), the discard of a packet which is in the bucket, the switching of the order of packets, and the creation of a duplicate packet. Accordingly, the packet latency is automatically determined.

<2. Modified Example>

It should be understood by those skilled in the art that various modifications, combinations, sub-combinations and alterations may occur depending on design requirements and other factors insofar as they are within the scope of the appended claims or the equivalents thereof.

For example, in the present embodiment, the communication state which is to be a subject to be measured is measured when the transmission rate is discretely varied from 0 to a maximum reception rate, but the present embodiment is not limited thereto. For example, the transmission rate may be varied from 0 Mbps to 10 Mbps, from 10 Mbps to 20 Mbps, and from 20 Mbps to 30 Mbps, and each communication state at the point of variation may be measured and used. The thus measured communication state is used for the simulation, thereby enhancing the accuracy of the simulation.

Further, there may be used, as the communication state, a communication state measured at each given time, a communication state measured at each given day of the week, or the like. Accordingly, the simulation can be performed, on which the difference in communication state based on day of the week and time is reflected.

<3. Summary>

According to the present embodiment, it is possible to calculate the network state without the necessity to exactly reproduce the real environment and without any influence of the traffic generated by allowing the test packet to flow. Further, according to the present embodiment, the following effects can be obtained by acquiring in advance the measurement data related to the communication via a complicated and difficult-to-predict network: the network simulation can be performed with simple implementation; implementation independent of a network layer corresponding to a lower layer can be realized; and a highly reproducible simulation can be performed.

What is claimed is:

1. A communication device comprising:
   a communication state determination section which determines a first communication state corresponding to a first transmission rate demanded from a simulation engine based on a second transmission rate and a second state of communication at the second transmission rate between a first communication state measurement device and a second communication state measurement device via a real network;
   a traffic generation section which generates traffic by creating data based on the first communication state determined by the communication state determination section;
   a protocol processing section which creates a packet comprising the data created by the traffic generation section; and
   a communication section which transmits the packet created by the protocol processing section to another communication device,
   wherein the communication state determination section determines, as the first communication state, the second state of communication between the first communication state measurement device and the second communication state measurement device via the real network at the second transmission rate close to the first transmission rate demanded from the simulation engine,
   wherein, when the second transmission rate of the communication between the first communication state measurement device and the second communication state measurement device via the real network increases in stages, and where the second transmission rate which increases in stages is represented by $S''k$ ($0 \leq k \leq n-1$) and the first transmission rate demanded from the simulation engine is represented by $S'$, the communication state determination section calculates k which satisfies $S' > S''k$ for the first time when k, starting with n−1, is decreased by 1 at a time, updates k with a value obtained by adding 1 to the calculated k, and determines $S''k$ expressed by the updated k as the first communication state.

2. The communication device according to claim 1, wherein, where the second transmission rate which increases in stages is represented by $S''k$ ($0 \leq k \leq n-1$), the first transmission rate demanded from the simulation engine is represented by $S'$, and a predetermined coefficient is represented by $\alpha$, the communication state determination section determines, as the first communication state, k which satisfies $S' < S''k - \alpha\,(S''k - S''k-1)$ for the first time when k, starting with 1, is increased by 1 at a time.

3. The communication device according to claim 1, wherein the communication state determination section determines the first communication state based on statistical data obtained by performing statistical processing on the second transmission rate and the second state of the communication at the second transmission rate between the first communication state measurement device and the second communication state measurement device via the real network.

4. The communication device according to claim 3, wherein, when the second transmission rate of the communication between the first communication state measurement device and the second communication state measurement device via the real network increases in stages, and where the second transmission rate which increases in stages is represented by $S''k$ ($0 \leq k \leq n-1$), the first transmission rate demanded from the simulation engine is represented by $S'$, and an average value of reception rates corresponding to the second transmission rate $S''0, 1, \ldots, n-1$ is represented by $R''0, 1, \ldots, n-1$, the communication state determination section finds k which satisfies $S''k \leq S' < S''k+1$, calculates a coefficient $\alpha$ by using Equation (1) $\alpha = 1 - (S' - S''k)/(S''k+1 - S''k)$, calculates the average value $R'$ of reception rates with respect to $S'$ by using Equation (2) $R' = \alpha \cdot R''k + (1-\alpha) \cdot R''k+1$, calculates a dispersion value $\sigma'$ with respect to $S'$, generates normal distribution random numbers based on $R'$ and $\sigma'$, calculates a third transmission rate based on the generated normal distribution random numbers, and determines a third state of communication corresponding to the calculated third transmission rate as the first communication state.

5. A communication method, comprising the steps of:
determining a first communication state corresponding to a first transmission rate demanded from a simulation engine based on a second transmission rate and a second state of communication at the second transmission rate between a first communication state measurement device and a second communication state measurement device via a real network;

generating traffic by creating data based on the first communication state;

creating a packet including the data; and transmitting the packet to another communication device, wherein, where the second transmission rate which increases in stages is represented by $S''k$ ($0 \leq k \leq n-1$), the first transmission rate demanded from the simulation engine is represented by $S'$, and a predetermined coefficient is represented by $\alpha$, the determination of the the first communication state comprises determination of k which satisfies $S' < S''k - \alpha (S''k - S''k-1)$ for the first time when k, starting with 1, is increased by 1 at a time.

6. A non-transitory computer readable medium having stored thereon, a computer program having at least one code section executable by a computer, thereby causing the computer to perform the steps comprising:

determining a first communication state corresponding to a first transmission rate demanded from a simulation engine based on a second transmission rate and a second state of communication at the second transmission rate between a first communication state measurement device and a second communication state measurement device via a real network;

generating traffic by creating data based on the first communication state;

creating a packet including the data; and transmitting the packet to another communication device, wherein, when the second transmission rate of the communication between the first communication state measurement device and the second communication state measurement device via the real network increases in stages, and where the second transmission rate which increases in stages is represented by $S''k$ ($0 \leq k \leq n-1$), the first transmission rate demanded from the simulation engine is represented by $S'$, and an average value of reception rates corresponding to the second transmission rate $S''0, 1, \ldots, n-1$ is represented by $R''0, 1, \ldots, n-1$, the determination of the first communication state comprises finding k which satisfies $S''k \leq S' < S''k+1$, calculating a coefficient $\alpha$ by using Equation (1) $\alpha = 1 - (S' - S''k)/(S''k+1 - S''k)$, calculating the average value $R'$ of reception rates with respect to $S'$ by using Equation (2) $R' = \alpha \cdot R''k + (1-\alpha) \cdot R''k+1$, calculating a dispersion value $\sigma'$ with respect to $S'$, generating normal distribution random numbers based on $R'$ and $\sigma'$, calculating a third transmission rate based on the generated normal distribution random numbers, and determining a third state of communication corresponding to the calculated third transmission rate as the first communication state.

* * * * *